United States Patent
Barkow et al.

(10) Patent No.: US 12,315,676 B2
(45) Date of Patent: May 27, 2025

(54) CAPACITOR WITH ELECTRICALLY CONDUCTIVE COOLING CHANNEL

(71) Applicant: Dr. Ing. h.c. F. Porsche Aktiengesellschaft, Stuttgart (DE)

(72) Inventors: Maximilian Barkow, Stuttgart (DE); Patrick Fuchs, Leonberg (DE); Timijan Velic, Weissach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/867,692

(22) Filed: Jul. 19, 2022

(65) Prior Publication Data

US 2023/0024031 A1    Jan. 26, 2023

(30) Foreign Application Priority Data

Jul. 20, 2021    (DE) .................... 10 2021 118 754.0

(51) Int. Cl.
| | |
|---|---|
| *H01G 2/08* | (2006.01) |
| *H01G 4/228* | (2006.01) |
| *H01G 4/32* | (2006.01) |
| *H01G 4/38* | (2006.01) |

(52) U.S. Cl.
CPC .............. *H01G 2/08* (2013.01); *H01G 4/228* (2013.01); *H01G 4/32* (2013.01); *H01G 4/38* (2013.01)

(58) Field of Classification Search
CPC ........... H01G 4/38; H01G 4/32; H01G 4/228; H01G 2/08
See application file for complete search history.

(56) References Cited

U.S. PATENT DOCUMENTS

| | | | | |
|---|---|---|---|---|
| 5,214,564 A | * | 5/1993 | Metzler ................... | H01G 2/08 361/677 |
| 5,673,168 A | * | 9/1997 | Efford ..................... | H01G 4/32 361/519 |
| 6,430,024 B1 | * | 8/2002 | Gernert ................... | H01G 2/08 361/535 |
| 1,047,733 A1 | | 11/2019 | Skalski | |
| 10,477,733 B1 | * | 11/2019 | Skalski ................... | H01G 2/08 |
| 2014/0126107 A1 | * | 5/2014 | Yoda ...................... | H01G 4/385 361/303 |
| 2014/0162106 A1 | | 6/2014 | Fuerstner et al. | |
| 2016/0365197 A1 | * | 12/2016 | Lavene ................. | H01G 9/0003 |

(Continued)

FOREIGN PATENT DOCUMENTS

| | | | | |
|---|---|---|---|---|
| CH | 368236 A | | 3/1963 | |
| DE | 102016219213 A1 | * | 4/2018 | ............... H01G 2/04 |

(Continued)

OTHER PUBLICATIONS

Machine translation of DE102016219213A1 (Year: 2024).*

*Primary Examiner* — David M Sinclair
(74) *Attorney, Agent, or Firm* — LEYDIG, VOIT & MAYER, LTD.

(57) ABSTRACT

A capacitor is disclosed that includes a plurality of electrically conductive capacitor layers wound around a winding center and a cooling channel, wherein the cooling channel is disposed between the capacitor layers, and wherein the cooling channel is electrically conductive. A system and a motor vehicle that includes the capacitors is also disclosed.

17 Claims, 8 Drawing Sheets

(56) References Cited

U.S. PATENT DOCUMENTS

| | | | |
|---|---|---|---|
| 2017/0244143 A1* | 8/2017 | Burgers | H01M 10/643 |
| 2018/0019062 A1* | 1/2018 | Okuzuka | H01G 2/106 |
| 2020/0127347 A1* | 4/2020 | Waddell | H01M 50/204 |
| 2021/0226280 A1* | 7/2021 | Dieckmann | H01M 10/613 |
| 2022/0255162 A1 | 8/2022 | Lambourne | H01M 50/502 |
| 2022/0384105 A1* | 12/2022 | Wiecek | E21B 7/15 |

FOREIGN PATENT DOCUMENTS

| | | | | |
|---|---|---|---|---|
| DE | 102019116179 A1 | | 12/2019 | |
| EP | 1028439 A1 | * | 8/2000 | H01G 2/08 |
| JP | 2008300600 A | | 12/2008 | |
| JP | 2008311252 A | * | 12/2008 | |
| JP | 2008311253 A | | 12/2008 | |
| JP | 2012009499 A | * | 1/2012 | |

* cited by examiner

CAPACITOR WITH ELECTRICALLY CONDUCTIVE COOLING CHANNEL

CROSS REFERENCE TO RELATED APPLICATIONS

This application claims benefit to German Patent Application No. DE 10 2021 118 754.0, filed on Jul. 20, 2021, which is hereby incorporated by reference herein.

FIELD

The present invention relates to a capacitor.

BACKGROUND

Film capacitors, in which insulating plastic films are used as the dielectric, are known from the prior art. For this purpose, the plastics are drawn into extremely thin films in special processes, provided with the electrodes and then wound as a coil or assembled in stacks of individual layers to form a capacitor.

As is the case for many electronic components, such capacitors generate heat during operation. This is true in particular when the capacitors are operated as power electronic components, for example in an inverter or DC/DC converter. The desire for ever larger power outputs and ever more compact designs makes it necessary to dissipate the heat particularly efficiently in order to also achieve a long service life for the capacitors.

A capacitor in which cooling channels are disposed between the capacitor layers is known from CH 368 236 A.

SUMMARY

In an embodiment, the present disclosure provides a capacitor comprising a plurality of electrically conductive capacitor layers wound around a winding center and a cooling channel, wherein the cooling channel is disposed between the capacitor layers, and wherein the cooling channel is electrically conductive.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In contrast to prior art capacitors, embodiments of the present invention enable a particularly compact design of a capacitor. In some embodiments, a motor vehicle comprising such a capacitor is provided.

In an embodiment, a capacitor comprises a plurality of electrically conductive capacitor layers wound around a winding center. In the context of this description, the term "winding center" is to be understood as a geometric term and not a component. The winding center defines a region around which the capacitor layers are wound. The capacitor layers can be a single contiguous coil, for example. The capacitor can be a film capacitor, for example. The capacitor also comprises a cooling channel. In the context of this description, a cooling channel is in particular understood to mean a component that is configured to conduct a fluid from a first opening to a second opening without losses or with extremely low losses. The cooling channel is disposed between the capacitor layers. The cooling channel can be disposed inside or outside the winding center, for example.

The cooling channel is electrically conductive. The cooling channel can, for example, have a wall that is made of metal. The cooling channel preferably has a conductivity of more than $10^6$ S/m. The cooling channel can comprise copper and/or aluminum, for example. It is also possible for the cooling channel to be made of copper and/or aluminum.

The cooling channel can thus carry out two functions. A cooling medium can flow through it to remove heat from the capacitor. The cooling channel can also be used to carry potential and/or current. This can in particular also lower the inductance of the capacitor, so that the capacitor is more suitable as a fast-switching power element, for example for operation with fast-switching power semiconductors.

According to an embodiment of the invention, the capacitor can comprise a first terminal and a second terminal at a first end. The first terminal and the second terminal can each be configured for electrical connection to at least one other electronic component. The capacitor can have a second end which is disposed opposite to the first end. The cooling channel can electrically connect the second end to the second terminal. The electrical potential present at the second end of the capacitor can thus be carried to the second terminal disposed at the first end via the electrically conductive cooling channel. The advantage is that the capacitor only has to be electrically contacted at the first end. The first terminal can be electrically insulated from the second terminal by an insulation layer, for example. It should be noted that, in the context of this description, the first end of the capacitor is in particular understood to mean an end region which comprises both the first terminal and the second terminal and the insulation layer. The end region can therefore be three-dimensional and include an outward-facing end surface which forms the end of the capacitor.

According to an embodiment of the invention, the cooling channel can be configured as a tube. It is in particular possible for the tube to be round. The tube can have a circular cross-section, for example, or an elliptical cross-section. The cooling channel can be disposed in the winding center and form a winding core on which the capacitor layers are wound. This can in particular mean that the capacitor layers are wound directly onto the cooling channel during the production of the capacitor. The cooling channel can thus also carry out a third function, namely that of the winding core.

According to an embodiment of the invention, the cooling channel can comprise a first opening and a second opening which are disposed opposite to one another. The cooling channel can be connectable to a first cooling medium line via the first opening and to a second cooling medium line via the second opening, so that a cooling medium can flow from the first cooling medium line through the cooling channel into the second cooling medium line. It is thus possible for the cooling medium to flow from the first cooling medium line through the cooling channel into the second cooling medium line during operation of the capacitor. In the context of this description, a cooling medium is in particular understood to mean a fluid that is prepared to absorb and dissipate heat generated by the capacitor. The cooling medium can be heated in the capacitor, for example, and release its heat outside the capacitor to another medium, in particular via a heat exchanger. The cooling medium can be prepared to be electrically insulating, for example.

The system according to an embodiment comprises a plurality of capacitors and a current conducting rail. The capacitors are electrically connected to one another via the current conducting rail. The capacitors disposed in this way can respectively also be referred to individually as capacitor coils. The first cooling medium line is disposed on the current conducting rail and extends parallel to the current conducting rail. The current conducting rail can form a wall of the cooling medium line, for example.

The electrical connection to the current conducting rail is in particular advantageous for a system that is especially easy to assemble.

It is in particular possible for the system to comprise a further current conducting rail, via which the capacitors are electrically connected to one another and on which the second cooling medium line is disposed. The further current conducting rail can form a wall of the second cooling medium line, for example.

According to an embodiment of the invention, the first cooling medium line can comprise a plurality of projections that increase a contact surface of the first cooling medium line which is in communication with an environment of the system. The same can correspondingly be provided for the second cooling medium line. These projections can improve the heat dissipation from the cooling medium to the environment. The projections can be rib-shaped, for example. If the current conducting rail forms a wall of the first cooling medium line, the current conducting rail can comprise the projections, for example.

The system according to an embodiment comprises a plurality of capacitors, each of which has a plurality of electrically conductive capacitor layers wound around a winding center. The system comprises a plurality of cooling channels respectively disposed between the capacitors. The capacitors can, for example, include features which are described previously in this description.

The arrangement of the cooling channels between the capacitors is particularly advantageous for a space-saving arrangement and efficient heat dissipation.

According to an embodiment of the invention, the cooling channels can respectively be disposed in free spaces between the capacitors which are defined by respectively adjacent capacitors. The free spaces can thus be defined exclusively by the adjacent capacitors, for example. It is in particular possible for the capacitors to be disposed such that they adjoin one another. For example, one of the capacitors can adjoin at least four or even six of the other capacitors. The free spaces can then result from the shape of the capacitors, for example a circular or elliptical cross-sectional shape, or a flat coil.

According to an embodiment of the invention, the cooling channels can be electrically conductive.

According to an embodiment of the invention, a motor vehicle comprises a system or capacitor as described herein. The system or the capacitor can be part of an inverter or DC/DC converter of the motor vehicle, for example.

Figure 1:
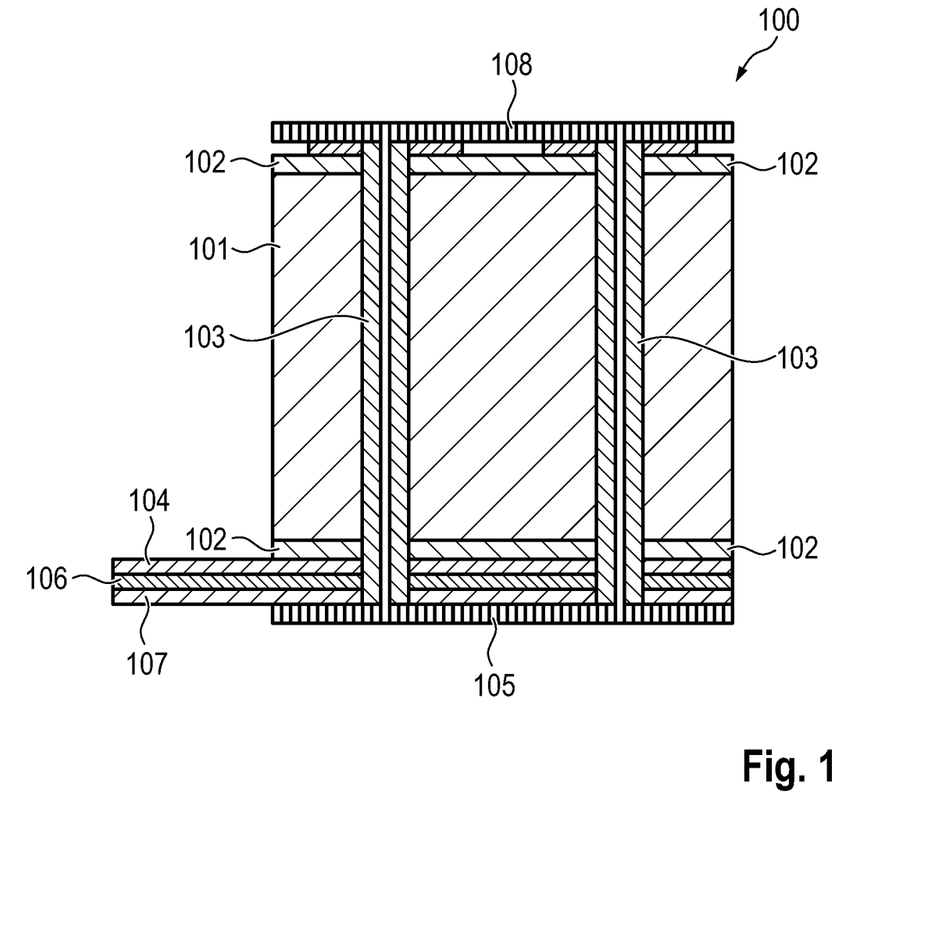
FIG. 1 shows a schematic sectional view of a capacitor according to an embodiment of the invention.

The capacitor 100 in FIG. 1 comprises a plurality of capacitor layers configured as coils 101. The coil 101 is coated with a Schoop layer 102 on two opposing ends. This can be a metal layer, for example, which has been vapor-deposited. It serves to provide electrical contact with the coil 101. The coil is wound around two cooling channels 103. The cooling channels 103 are electrically conductive.

The capacitor 100 also comprises a first current conducting rail 104 (also referred to herein as a first terminal), on which a first cooling medium line is disposed. The figures show only one wall of the first cooling medium line, which is formed in sections by a first metal sheet 105 and a second current conducting rail 107 (also referred to herein as a second terminal). The first current conducting rail 104 is used to carry potential. The capacitor 100 can be electrically connected to a plurality of other, preferably structurally identical capacitors 100 via the first current conducting rail 104, for example. The capacitor 100 also comprises a second cooling medium line, the wall of which is formed at least in sections by a second metal sheet 108. The first cooling medium line is disposed at a first end of the capacitor 100 which is disposed opposite to a second end of the capacitor 100, wherein the second cooling medium line is disposed at the second end.

The first cooling medium line and the second cooling medium line are connected to one another via the cooling channels 103, so that heat generated inside the coil 101 can be reliably and efficiently dissipated into the first or second cooling medium line by a fluid flowing through the cooling channels 103.

The electrical conductivity of the cooling channels 103 enables an electrical potential to be carried from the second end of the capacitor 100 to the second current conducting rail 107 at the first end of the capacitor 100 through the coil 101. The capacitor 100 can also be electrically connected to a plurality of other structurally identical capacitors 100 via the second current conducting rail 107. The second current conducting rail 107 is thus likewise used to carry potential. Due to the different potentials of the first current conducting rail 104 and the second current conducting rail 107, the two current conducting rails 104 and 107 are electrically insulated from one another by means of an insulation layer 106.

During operation, the cooling medium can flow from the first cooling medium line through the cooling channels 103 to the second cooling medium line, for example, or in the opposite direction.

The cooling channels 103 thus carry out three functions in one component. First, they serve to carry potential, because they are electrically conductive. Second, they serve as a winding core on which the coil 101 is wound. Third, they reliably and efficiently dissipate heat from the winding center of the capacitor 100.

Figure 2:
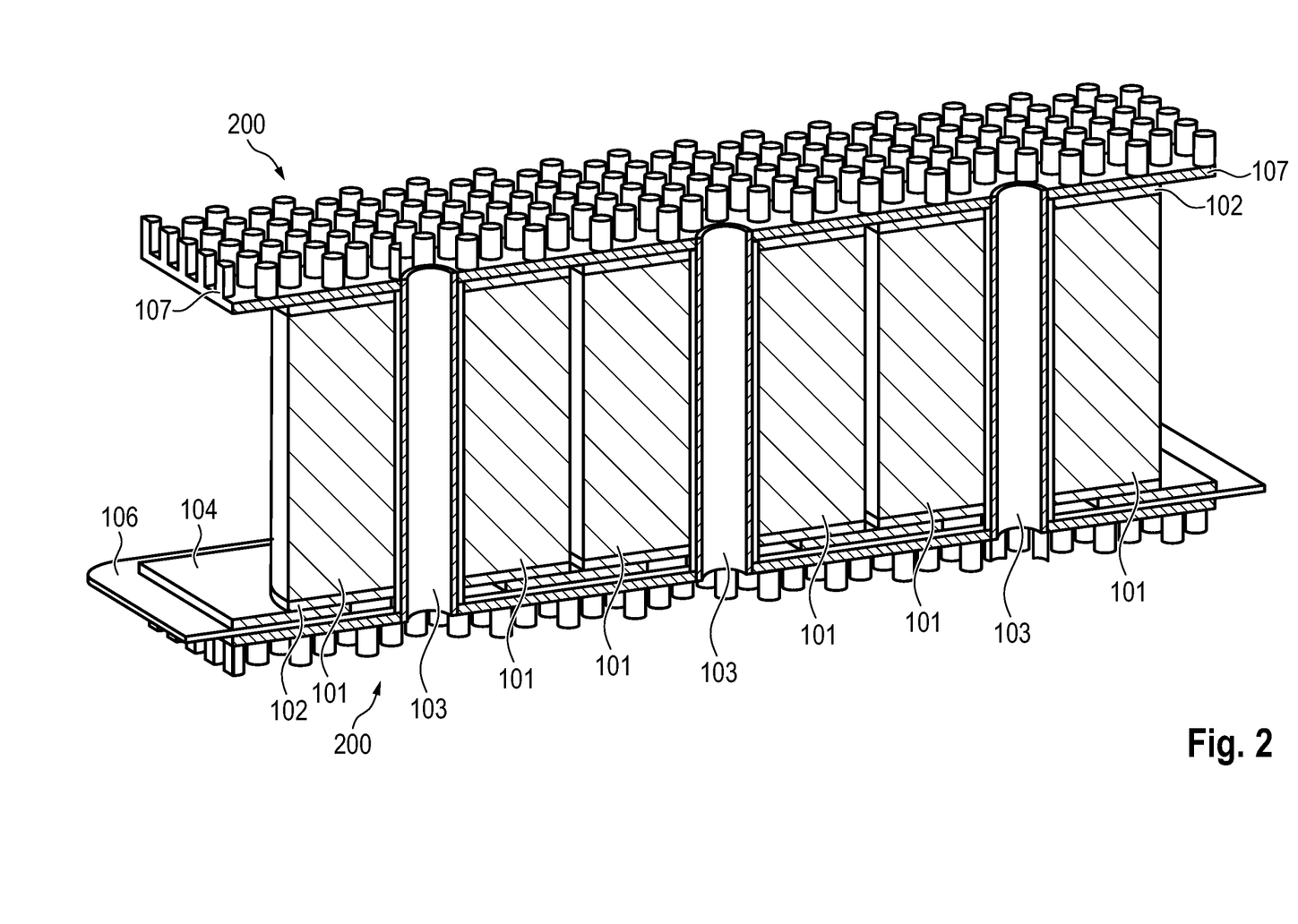
FIG. 2 shows a schematic sectional view of a system according to an embodiment of the invention with adjacently disposed capacitors.

The system shown in FIG. 2 includes a plurality of capacitors, each of which comprises a coil 101 wound around a cooling channel 103. Unlike the capacitor 100 shown in FIG. 1, the second current conducting rail 107 is disposed at the second end of the capacitors 100.

Figure 3:
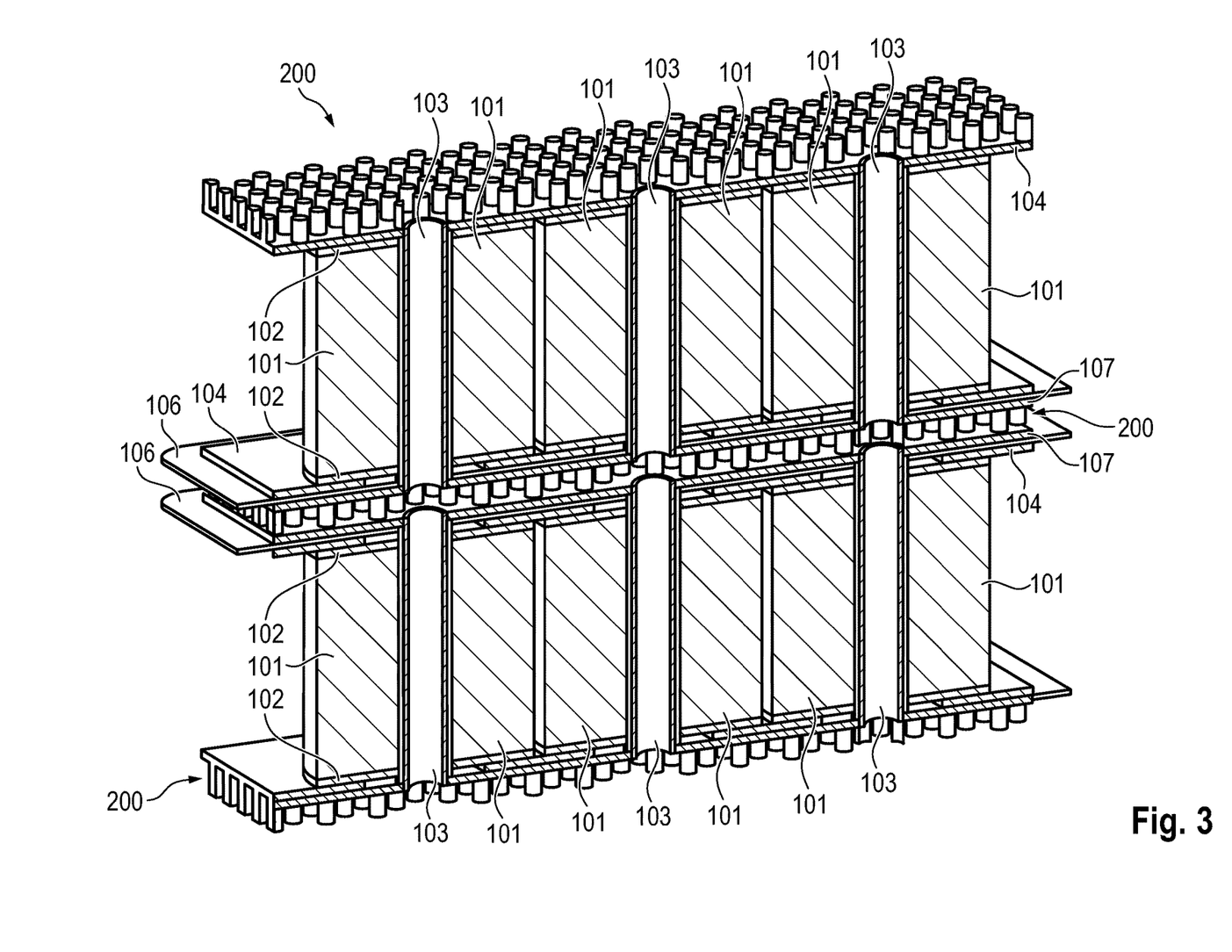
FIG. 3 shows a schematic sectional view of a system according to an embodiment of the invention with capacitors disposed one above the other and adjacently.

Much more importantly, however, in the system in FIG. 2, the first and the second cooling medium line each comprise a plurality of projections 200 that increase the surface area of the respective cooling medium line so that the heat absorbed by the capacitor can be better dissipated to the environment. In FIGS. 2 and 3, a wall of the respective cooling medium line is formed by one of the current conducting rails 104 and 107, so that the projections 200 are disposed on the current conducting rails 104 and 107.

The system shown in FIG. 3 comprises a plurality of capacitors 100 disposed one above the other and adjacently. The adjacently disposed capacitors are respectively connected to one another via current conducting rails 104 and 107. Similarly to the capacitor 100 shown in FIG. 1, the current conducting rails 104 and 107 are disposed at the same end of the capacitors 100. This is possible because the cooling channels 103 are electrically conductive.

It should also be noted that the lower capacitors have the two current conducting rails 104 and 107 at their upper end, whereas the upper capacitors have their current conducting rails 104 and 107 at their lower end. As a result, all of the current conducting rails 104 and 107 are disposed between the upper and lower capacitors, thus achieving a particularly compact design.

Figure 4:
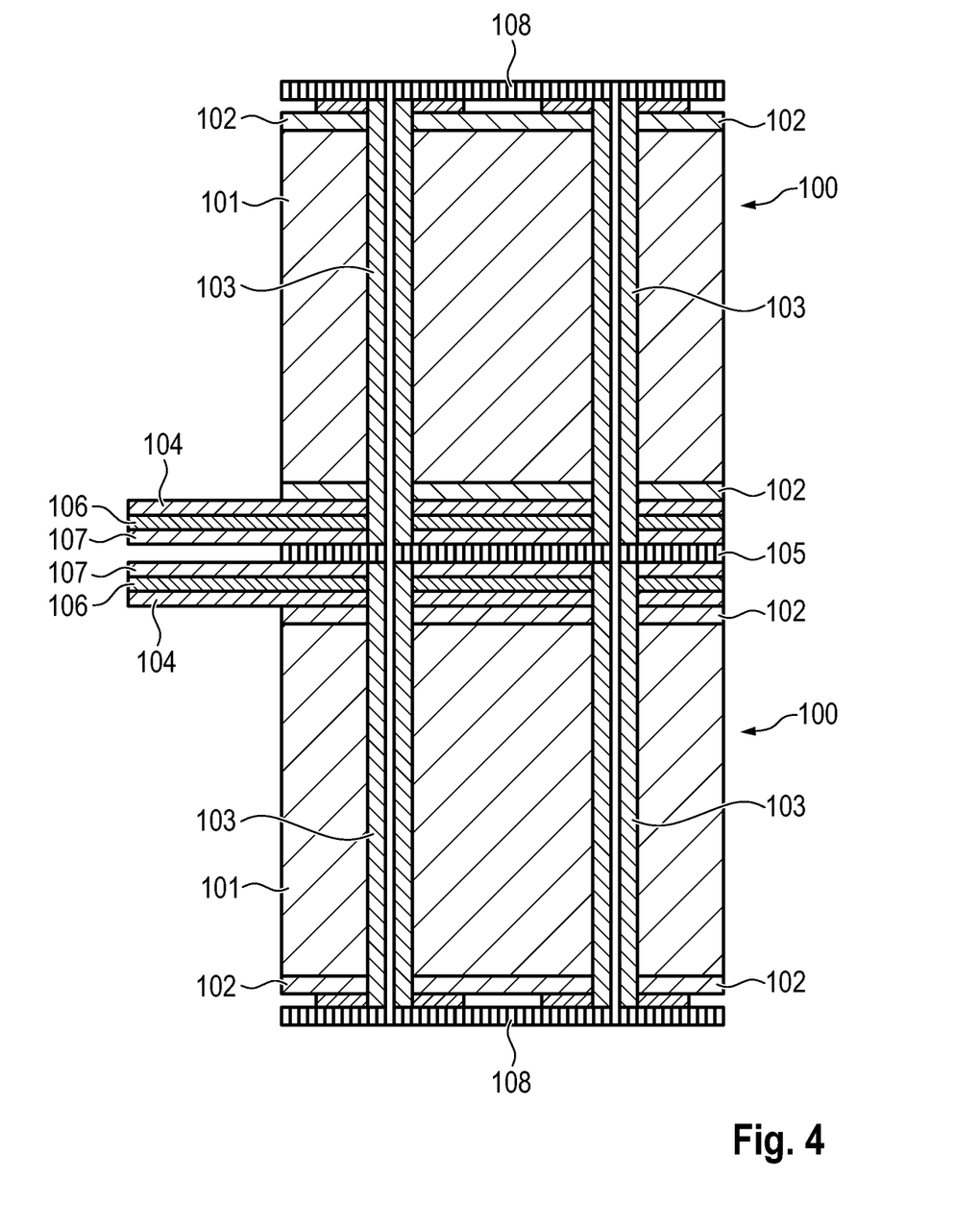
FIG. 4 shows a schematic sectional view of two capacitors disposed one above the other.

FIG. 4 shows two capacitors 100, which are disposed one above the other and correspond to the capacitors 100 of FIG. 3. The first end of the lower capacitor 100 faces the first end of the upper capacitor 100 so that, as in FIG. 3, the current conducting rails 104 and 107 of both the upper capacitor 100 and the lower capacitor 100 are disposed centrally between the upper capacitor 100 and the lower capacitor 100. This is possible because of the electrical conductivity of the cooling channels 103, which are used to carry potential from the second end to the respective current conducting rail 107 at the first end.

Figure 5:
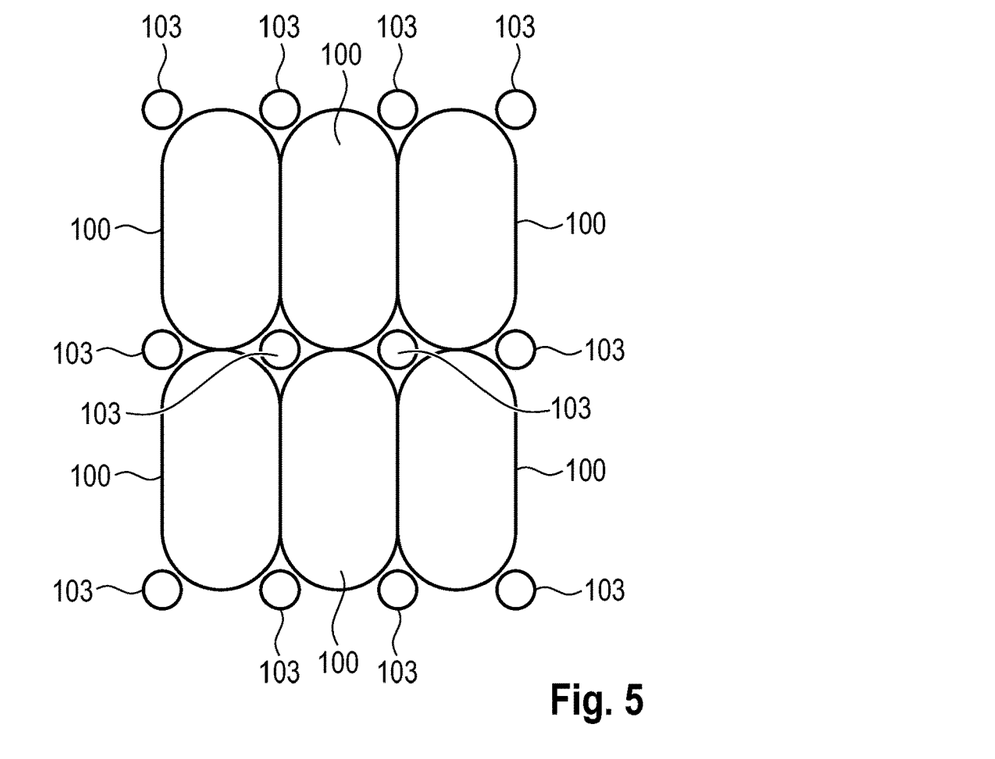
FIG. 5 shows a cross-sectional view through a system comprising a plurality of capacitors and cooling channels disposed in free spaces defined by the capacitors.

FIG. 5 shows a plurality of flat coil capacitors 100. In cross-section, they have a shape comprising two parallel straight sections which are connected to one another at their ends via a circular arc section. This shape results in free spaces between the capacitors 100 in which cooling channels 103 are disposed, so that these free spaces are used to dissipate heat. This is advantageous, in particular because the free spaces would not be able to be filled or reduced by increasing the size of the coils 101 of the capacitors 100 by winding more layers around the winding center. This is not possible, because adjacent capacitors 100 already abut one another. This makes particularly efficient use of the available installation space.

Figure 6:
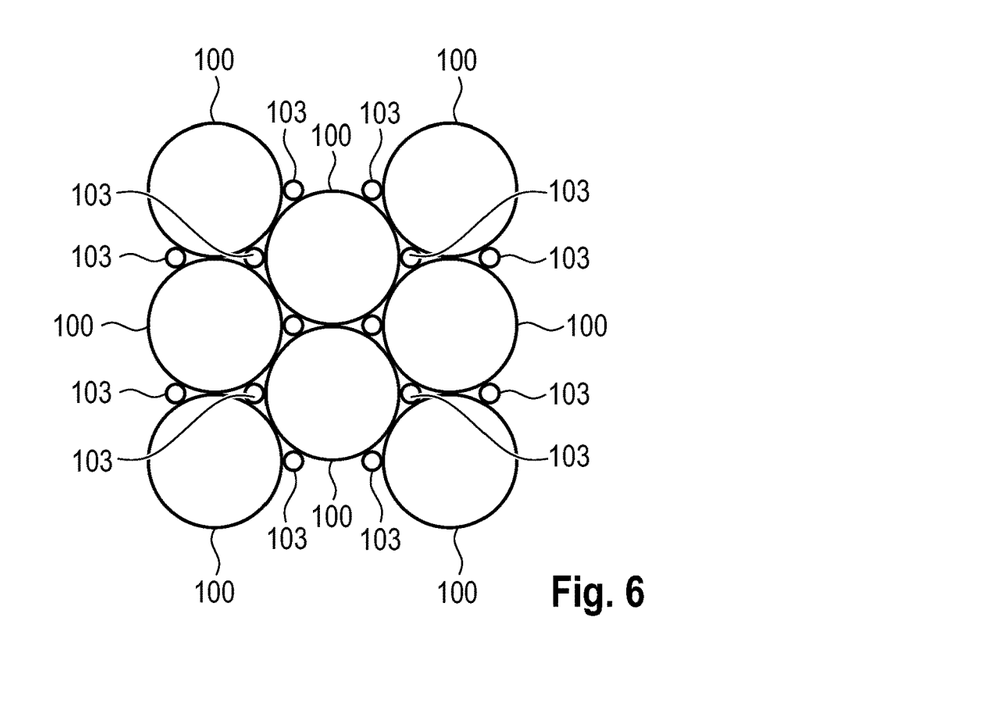
FIG. 6 shows a cross-sectional view through a system comprising a plurality of capacitors and cooling channels disposed in free spaces defined by the capacitors.

The capacitors 100 in FIG. 6 had a circular cross-sectional area. Similar to the capacitors 100 of FIG. 6, there are free spaces between the capacitors 100 that cannot be filled by increasing the size of the capacitors. The cooling channels 103 are disposed in these free spaces. Thus, this system likewise makes particularly efficient use of the available installation space.

Figure 7:
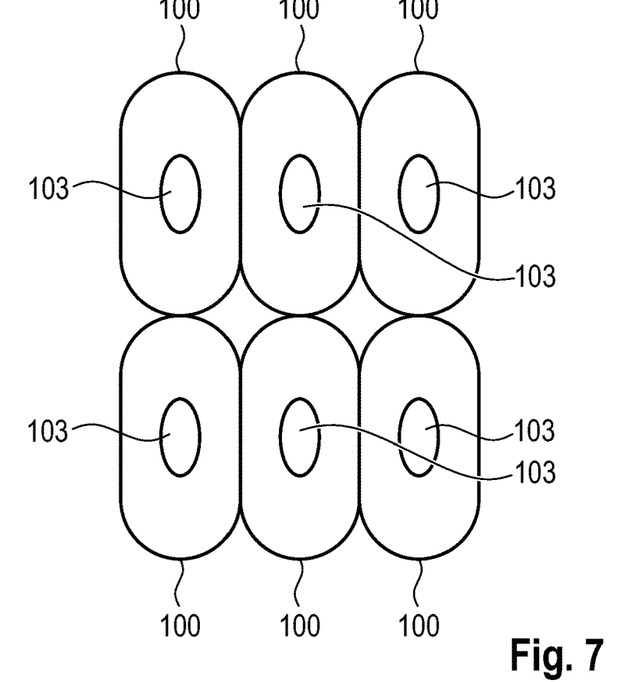
FIG. 7 shows a cross-sectional view through a system comprising a plurality of capacitors with cooling channels as winding cores.
Figure 8:
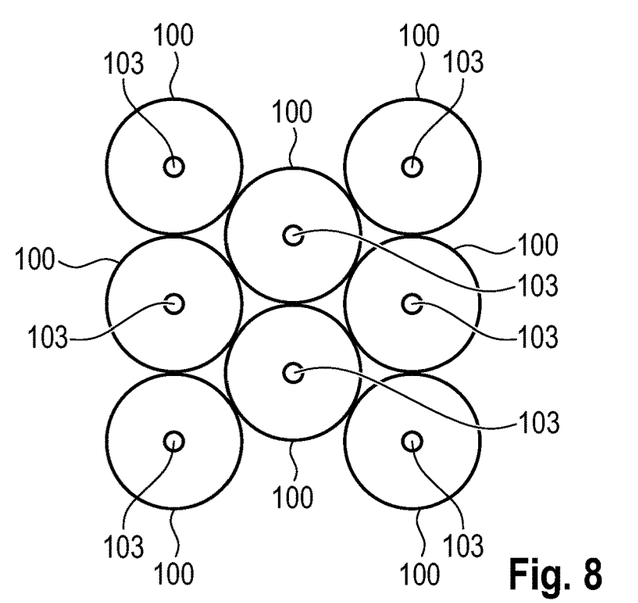
FIG. 8 shows a cross-sectional view through a system comprising a plurality of capacitors with cooling channels as winding cores.

FIGS. 7 and 8 show capacitors 100 having cross-sectional shapes as in FIGS. 5 and 6, in which the coils are respectively wound on a cooling channel 103. In these cases, the cooling channel can carry out three respective functions: carrying electrical potential, cooling and being a winding core.

Figure 9:
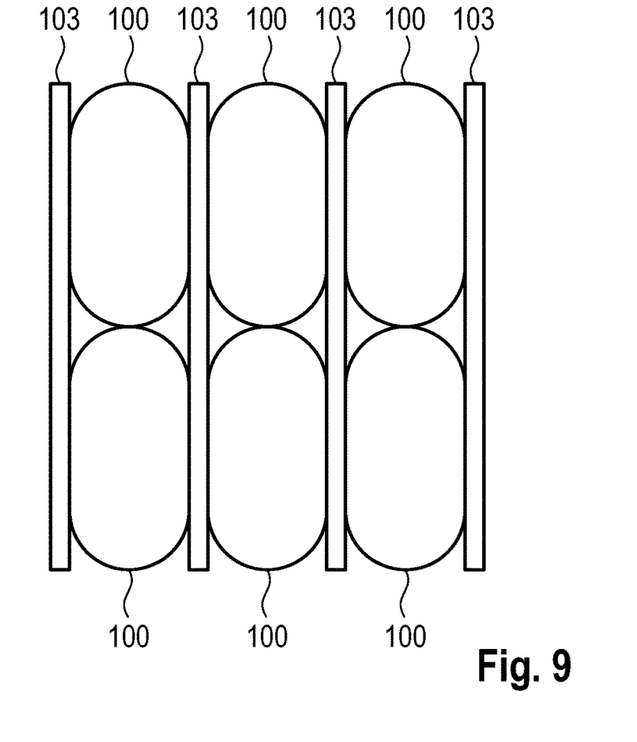
FIG. 9 shows a cross-sectional view through a system comprising a plurality of capacitors and cooling channels disposed in free spaces defined by the capacitors.

FIG. 9 shows a plurality of capacitors 100, between which cooling channels 103 are respectively disposed. In each case, one cooling channel 103 simultaneously abuts a plurality of capacitors 100, so that a particularly small number of components are used for assembly.

Figure 10:
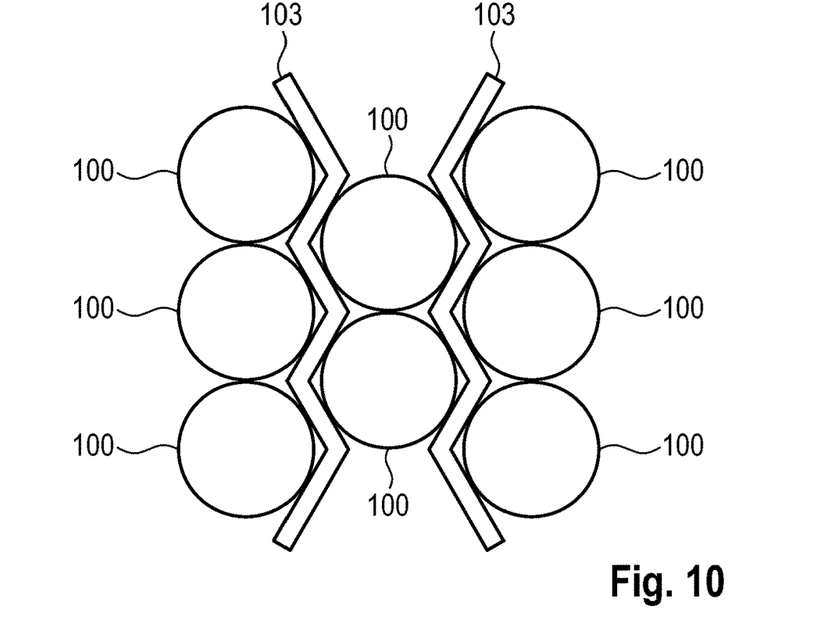
FIG. 10 shows a cross-sectional view through a system comprising a plurality of capacitors and cooling channels disposed in free spaces defined by the capacitors.
Figure 11:
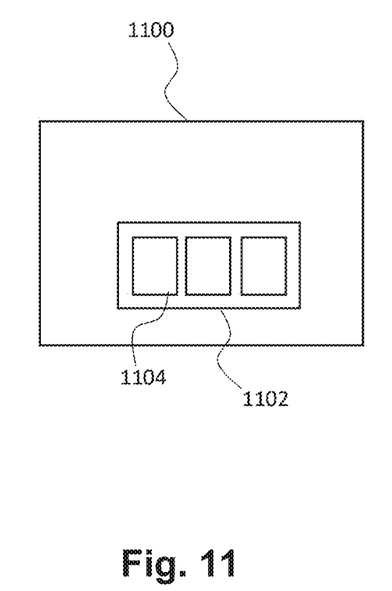
FIG. 11 shows a motor vehicle comprising a system with a plurality of capacitors.

FIG. 10 shows a plurality of capacitors 100, between which cooling channels 103 are respectively disposed. Here, too, one cooling channel 103 simultaneously abuts a plurality of capacitors 100. Due to the circular shape of the capacitors 100, the cooling channels respectively extend in a zigzag pattern. FIG. 11 shows a motor vehicle 1100 comprising a system 1102 (which can be, for example, the system of FIG. 2) with a plurality of capacitors 1104 (which can be, for example, the capacitors of FIG. 2). FIG. 11 is understood to be schematic only and does not impart any particular shape or size to the motor vehicle 1100. Moreover, as FIG. 11 is a schematic illustration only, it will be readily understood that FIG. 11 does not depict the relative shape, size, or location of the system 1102 in the motor vehicle 1100.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A capacitor comprising:
    a plurality of electrically conductive capacitor layers wound around a winding center;
    a cooling channel;
    a first terminal and a second terminal at a first end;
    a first cooling medium line disposed on the second terminal at the first end; and a second cooling medium line disposed on a second end of the capacitor, the second end being disposed opposite to the first end,
wherein the cooling channel is disposed between the capacitor layers,
wherein the cooling channel is electrically conductive and electrically connects the first cooling medium line to the second cooling medium line,
wherein the first terminal and the second terminal are each configured for electrical connection to at least one other electronic component,
wherein the cooling channel electrically connects the second end to the second terminal, and
wherein the cooling channel is configured to conduct a cooling fluid from within the first cooling medium line to the second cooling medium line, or from within the second cooling medium line to the first cooling medium line.

2. The capacitor according to claim 1, wherein the cooling channel is configured as a tube, and wherein the cooling channel is disposed in the winding center and forms a winding core on which the capacitor layers are wound.

3. The capacitor according to claim 1, wherein the cooling channel comprises a first opening and a second opening which are disposed opposite to one another, and
wherein the cooling channel is connected to the first cooling medium line via the first opening and to the second cooling medium line via the second opening, so that the cooling medium flows from the first cooling medium line through the cooling channel into the second cooling medium line.

4. A system comprising a plurality of capacitors according to claim 3, the system further comprising a current conducting rail formed by the second terminals of the plurality of capacitors,
wherein the capacitors are electrically connected to one another via the current conducting rail, and
wherein the first cooling medium line is disposed on the current conducting rail and extends parallel to the current conducting rail.

5. The system according to claim 4, wherein the first cooling medium line comprises a plurality of projections that increase a contact surface of the first cooling medium line which is in communication with an environment of the system.

6. The system according to claim 4, wherein the system is arranged in a motor vehicle.

7. The capacitor according to claim 1, wherein the capacitor is arranged in a motor vehicle.

8. The capacitor according to claim 1, wherein the cooling channel is configured to transfer heat from the plurality of capacitor layers to the cooling fluid.

9. The capacitor according to claim 1, further comprising an insulation layer arranged between the first terminal and the second terminal.

10. The capacitor according to claim 9, wherein the first terminal, the insulation layer, and the second terminal are arranged parallel to one another.

11. The capacitor according to claim 10, further comprising a first metal sheet at the first end, and wherein the first terminal, the insulation layer, and the second terminal are arranged between the capacitor layers and the first metal sheet.

12. The capacitor according to claim 11, wherein the first terminal and the second terminal extend orthogonally relative to an axial extent of the cooling channel.

13. The capacitor according to claim 11, further comprising a first vapor-deposited metal layer, wherein the vapor-deposited metal layer is arranged between the capacitor layers and the first terminal.

14. The capacitor according to claim 13, further comprising a second metal layer and a second vapor-deposited metal layer, wherein the second vapor-deposited metal layer is arranged at an opposing end of the capacitor layers relative to the first vapor-deposited metal layer and the second metal layer is arranged at the second end opposite the first metal layer.

15. A system comprising:
a plurality of capacitors each comprising:
a plurality of electrically conductive capacitor layers wound around a winding center,
a first terminal and a second terminal at a first end, and
a second end disposed opposite the first end,
wherein the first terminal and the second terminal are each configured for electrical connection to at least one other electronic component;
a first cooling medium line disposed on the second terminal of each of the plurality of capacitors;
a second cooling medium line disposed on the second end of each of the plurality of capacitors; and
a plurality of cooling channels,
wherein the cooling channels are respectively disposed between the capacitors,
wherein the cooling channels each connect the second end to the second terminal of one of the plurality of capacitors, and
wherein the cooling channels are each configured to conduct a cooling fluid from within the first cooling medium line to the second cooling medium line, or from within the second cooling medium line to the first cooling medium line, and
wherein the cooling channels are electrically conductive and electrically connect the first cooling medium line to the second cooling medium line.

16. The system according to claim 15, wherein the cooling channels are respectively disposed in free spaces between the capacitors, and wherein the free spaces are defined by respectively adjacent capacitors.

17. A system, comprising:
a first capacitor and a second capacitor arranged in a stacked configuration, the first and second capacitors each including:
a plurality of electrically conductive capacitor layers wound around a winding center,
an electrically conductive cooling channel disposed between the capacitor layers,
a first terminal and a second terminal at a first end, and
a second end arranged opposite the first end,
wherein the cooling channel electrically connects the second end to the second terminal; and
a first cooling medium line disposed between the first capacitor and the second capacitor, the second terminal of the first capacitor forming a first wall of the first cooling medium line and the second terminal of the second capacitor forming a second wall of the first cooling medium line opposite the first wall,
wherein the first terminal and the second terminal of each capacitor are configured for electrical connection to at least one other electronic component,
wherein the cooling channel of each capacitor is configured to conduct a cooling medium to or from the first cooling medium line and through the capacitors, wherein each of the first and second capacitors have a second cooling medium line opposite the first cooling medium line, and wherein the cooling channel of each capacitor electrically connects the first cooling medium line to a respective second cooling medium line of the second cooling medium lines.

\* \* \* \* \*